Jan. 8, 1957 J. F. DOBOSY 2,777,020

DIRECT COUPLED HIGH FIDELITY AMPLIFIER

Filed June 22, 1951

INVENTOR.
JOSEPH F. DOBOSY
BY HIS ATTORNEYS
RICHEY & WATTS
BY Frederic B. Schramm 2,777,020
Patented Jan. 8, 1957

2,777,020

DIRECT COUPLED HIGH FIDELITY AMPLIFIER

Joseph F. Dobosy, Avon Lake, Ohio

Application June 22, 1951, Serial No. 232,887
5 Claims. (Cl. 179—171)

Figures 1, 2, 3:
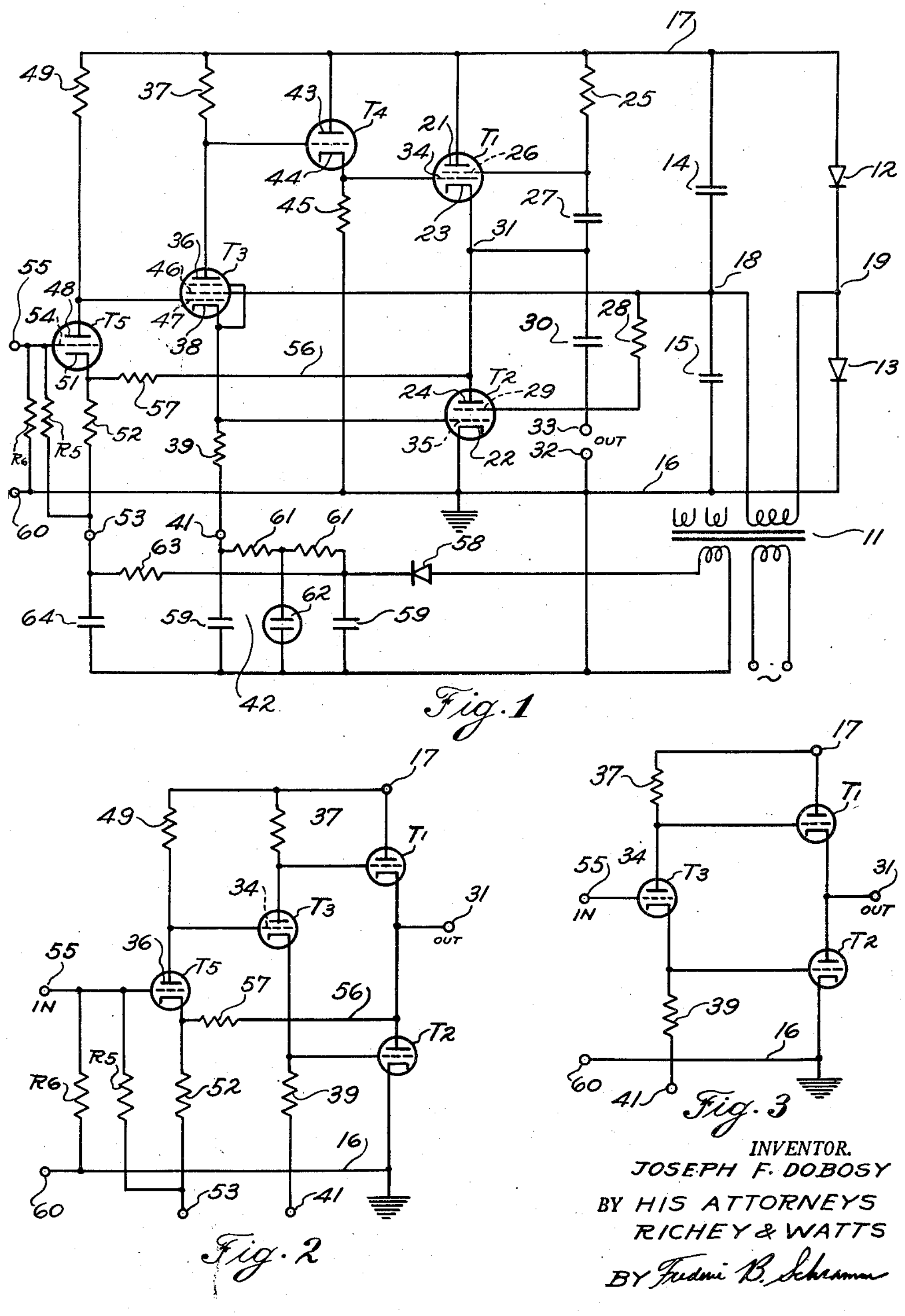

My invention relates to electronic amplification and has for its principal object producing efficient, high fidelity amplification of electrical voltage and power over a wide range of frequencies.

A further object is to provide a high fidelity amplifier with a high degree of reliability and capacity to deliver high overloads at frequencies down to substantially zero frequency or direct current as well as in the video region of the frequency spectrum.

A further object of the invention is to obtain prompt and faithful response to transient conditions and high fidelity amplification of speech and other signals of constantly varying frequency and amplitude which make the transient characteristics of the amplifier of as great importance as the characteristics under steady state conditions.

Another object of the invention is to make the magnitude and phase of the output voltage substantially independent of load impedance variations that would normally be encountered and to provide a generator having the power to be the principal factor in the determination of magnitude and phase of the output voltage.

Still another object is to apply corrective feedback for the reduction of distortion without creating undesirable transients.

A further object is to eliminate the necessity for direct-current flow in the load circuit, transformer coils, choke coils or devices which may be subject to magnetizing or to other unilateral effects.

An additional object is to permit grid excitation to enter the positive grid region without creating distortions or transients in the coupling circuits.

A further object is to accomplish maximum coupling efficiency and minmium reactive effects in a simple circuit.

Still another object is to permit the free interchange of direct current and direct-current potentials. It is also an object to make corrective feedback fully effective at direct current and to obtain great stability.

Other and further objects, features and advantages of the invention will become apparent as the description proceeds.

In carrying out the invention in accordance with a preferred form thereof, I provide a pair of direct coupled, output tubes, their grids driven in opposition, supplying a single ended output in parallel, thereby eliminating a requirement of supplying a substantial unity magnetic coupling between the output circuits of two opposing output tubes. The grids of the output tubes are supplied in opposite phase by a phase splitter circuit. Preferably, an input amplifier tube is provided, having a direct feedback connection from the output circuit. For the sake of obtaining a most faithful wave reproduction and permitting high positive peak currents to be supplied at high peak voltage, cathode follower connections are provided for exciting the grids of both the output tubes.

A better understanding of the invention will be afforded by the following detailed description considered in conjunction with the accompanying drawings, in which Fig. 1 is a circuit diagram of a preferred embodiment of the invention; and Fig. 2 is a simplified circuit diagram illustrating a manner of carrying out the invention with the use of triode vacuum tubes.

Fig. 3 is a diagram of a further simplified circuit.

Like reference characters are utilized throughout the drawings to designate like parts.

In the arrangement illustrated in Fig. 1, a pair of electronic discharge tubes $T_1$ and $T_2$ of the grid controlled type are providing having a suitable plate supply. By way of example, the plate power supply is illustrated as taking the form of a step-up transformer 11 energizing a voltage doubling rectifier circuit consisting of a pair of rectifier units 12 and 13, connected across a pair of condensers 14 and 15, connected in series between the plate input terminal lines represented as a grounded line 16 and positive high potential line 17. The secondary winding of the transformer 11 is connected to the common terminal 18 of the condensers 14 and 15 and to the common terminal 19 of the rectifier units 12 and 13. This circuit is preferred because it automatically provides a fixed appropriate screen potential for tubes $T_2$ and $T_3$.

As shown, the tube $T_1$ has an anode 21 connected to the positive side 17 of the plate supply and the tube $T_2$ has a cathode 22 connected to the negative side 16 of the plate supply. The tube $T_1$ has a cathode 23 connected to the anode 24 of the tube $T_2$. If the tubes $T_1$ and $T_2$ take the form of tetrode vacuum tubes, as illustrated, screen potential is provided by a dropping resistance 25 connected between the positive plate supply 17 and the screen grid 26, and a screen-voltage condenser 27 is connected between the screen grid 26 and the cathode 23. The screen potential for the tube $T_2$ is provided, by a dropping resistance 28 connected between the mid-terminal 18 of the plate power supply and the screen grid 29 of the tube $T_2$. In this case the condenser 15 serves also for stabilizing screen voltage. The output from the circuit is taken from the common terminal 31 of the tubes $T_1$ and $T_2$. For example, as illustrated, there may be a grounded terminal 32 and an ungrounded output terminal 33 coupled to the parallel output terminal 31 from the tubes $T_1$ and $T_2$ through a condenser 30.

For exciting grids or control electrodes 34 and 35 of the tubes $T_1$ and $T_2$ in phase opposition, a phase splitter is provided which may take the form of an electronic discharge tube $T_3$ shown as a pentode vacuum tube in Fig. 1, having an anode 36 connected to the positive side 17 of the plate supply through an anode resistor 37 and having a cathode 38 connected through a cathode resistor 39 preferably to a point below ground potential, such as a terminal 41 of a negative voltage power supply 42. The anode 36 of the tube $T_3$ is coupled to the grid 34 of the tube $T_1$ and the cathode 38 of the tube $T_3$ is coupled to the grid 35 of the tube $T_2$. For the latter coupling, a direct connection is provided since the tube $T_3$ acts as a cathode follower.

If large quantities of positive-current peak power are to be handled, preferably a cathode follower $T_4$ is inserted between the anode 36 of the tube $T_3$ and the grid 34 of the tube $T_1$. As illustrated, the tube $T_4$ may take the form of a triode vacuum tube having an anode 43 connected to the positive side 17 of the plate power supply and a cathode 44 connected through a cathode resistor 45 to the negative or grounded side 16 of the plate power supply, the cathode 44 being directly connected to the grid 34 of the tube $T_1$.

The tube $T_3$ may have a screen grid 46, voltage for which is provided by a suitable source, for example, as shown, the mid-terminal 18 of the power supply, to which the screen grid of the tube $T_3$ (equivalent to a triode anode) is directly connected in order to supply full power to the cathode 28 of the tube as a cathode follower. The input signal is supplied to the phase splitter tube $T_3$ through a control electrode or grid 47.

Preferably, an input amplifier tube $T_5$ is provided shown as a triode vacuum tube having an anode 48 connected through an anode resistor 49 to the positive side 17 of the plate power supply, a cathode 51 connected through a cathode resistor 52 to a suitable point such as a terminal 53 in the negative power supply 42 and a control electrode or grid 54 to which the input signal terminal 55 is connected. The anode 48 is coupled to the grid 47 of the phase splitter tube $T_3$, preferably by a direct connection where maximum fidelity is desired. For obtaining corrective feedback, effective at all frequencies, even at direct current, a direct connection is made between the cathode 51 of the input amplifier tube $T_5$ and the output terminal 31 of the output tubes $T_1$ and $T_3$, by connecting a conductor 56 between the cathode 51 of the tube $T_5$ and the anode 24 of the tube $T_2$, preferably with a current limiting resistor 57 interposed in the connection.

In order to maintain a suitable negative bias on the grid 54 of the input amplifier tube $T_5$, a voltage divider is provided, consisting of resistors $R_5$ and $R_6$, which are connected in series between the grounded signal terminal 60 and the negative terminal 53, which is the negative terminal for the circuit of the tube $T_5$. The input terminal 55 to which the grid 54 is connected, is as shown, the common terminal or junction terminal of the voltage divider terminals $R_5$ and $R_6$.

The negative power supply 42 may be of conventional form consisting as illustrated, of a rectifier unit 58 supplied from another secondary winding of the transformer 11, including conventional filter condensers 59 and series resistors 61 with a voltage regulator gas type tube 62 for the negative power supply terminal 41, and a filter circuit consisting of a resistor 63 and a condenser 64 for the negative supply terminal 53. It will be understood, however, that a separate negative power supply is not required and suitable relative potentials or biases of the various electrodes may be provided in any desired manner known to those skilled in the art.

The two output tubes $T_1$ and $T_2$ are direct coupled in order to obtain the unity coupling that is necessary between these tubes to prevent creation of transients which are otherwise unavoidable in push-pull class B circuits in which the output tubes are alternately driven beyond plate current cutoff. The direct coupling between $T_1$ and $T_2$ connects these two tubes in parallel, and since $T_1$ is a cathode follower, there is imparted to this output circuit an extremely low output impedance or generator impedance, which gives this generator the power to be the principal factor in the determination of the magnitude and phase of the output voltage, thereby maintaining these quantities substantially independent of load impedance variations that would normally be encountered. Under these conditions, since the generator impedance remains a substantially pure resistance over the entire range of normal operation, corrective feedback for the reduction of distortion can be applied without creating the undesirable transients which must occur in any amplifier with degenerative feedback in which the load impedance varies and can affect the phase of the output voltage from which the feedback voltage is derived. This connection of $T_1$ and $T_2$ furthermore eliminates the necessity of direct current flow in the load circuit, the transformer coils, or other choke coils because the tubes mutually supply initial plate current to each other; and, during operation, these tubes alternately valve only signal currents into the load.

Tube $T_3$ is a direct coupled driver for $T_1$ and $T_2$. This arrangement permits grid excitation to enter the positive grid region without creating distortions or transients in the coupling circuits. Maximum simplicity, maximum coupling efficiency, and minimum reactive effects are also achieved by this driver circuit.

The cathode follower $T_4$ is connected between $T_3$ and $T_1$ to provide the extra grid current required by $T_1$ during high power output peaks. The cathode follower has the fortunate property of being especially able to supply high positive peak currents at high voltage. This is exactly the requirement for efficiently exciting $T_1$. $T_4$ furthermore, draws very little current from the power supply except when high current is needed to drive $T_1$ during which interval $T_4$ actually delivers some of its output power directly to the amplifier load through the electron circuit which exists during this interval between the cathode and grid of $T_1$. This extra power is just what is needed to help reduce distortion during high power peaks.

The voltage amplifier $T_5$ provides the final step for the creation of a high fidelity amplifier that is capable of reproducing wave forms with great accuracy. The amplifier stage using $T_5$ is designed for maximum gain, minimum phase shift, and maximum cathode to ground impedance in order that the maximum amount of corrective feedback may be applied with greatest simplicity, greatest effectiveness, and at the expense of a minimum amount of the output power.

All circuits in this amplifier are direct coupled to permit the free interchange of direct current and direct current potentials. This applies also to the inverse or negative feedback circuit. Since the corrective feedback is thereby made fully effective at direct current, the amplifier possesses an extreme degree of stability. It is highly insensitive to variations in tube characteristics and resistor values except that the ratio of $R_5/R_6$ must be accurately maintained for maximum power output capability. $R_5$ and $R_6$ do not benefit from the self stabilizing property of the amplifier because these resistors must necessarily be outside of the feedback loop.

Operation of the output tubes of the amplifier is not limited to the negative grid region because direct coupling permits the transfer of power to the grids without setting up serious transients. This is further exploited by providing low impedance circuits to drive these grids, thereby increasing the amplifier efficiency, increasing the available power from any given tube and reducing the load resistance required for optimum termination of the amplifier.

As illustrated, in the case of the audio version of the amplifier, as well as some other possible versions, plate supply is fed to the output tubes connected in series and only minor currents can enter the point in this circuit between the output tubes, the average plate current flowing in these two tubes must therefore, remain substantially equal and a balanced condition of operation is continuously maintained.

When output tubes such as the 6V6 or 6L6 are used in the amplifier the optimum termination resistance for maximum power output for a pair of these tubes is in the order of 1000 ohms.

The output from the amplifier, in the absence of an output transformer, normally appears on two terminals, one of which is hard at ground potential. Only signal currents flow between these terminals as would be the case if an output transformer were used. It follows therefore, that it is practical to build the amplifier without providing space for an output transformer on the assumption that there is much more inexpensive space on the reproducer unit or in its cabinet for mounting the output transformer. In multiple reproducer sound reinforcing systems, the distribution line can readily be fed without a transformer at the amplifier.

The effectiveness of the corrective feedback at direct currents practically eliminates any necessity for "selecting" tubes to obtain optimum or maximum performance. Through the action of the direct current feedback, the tube biases are automatically adjusted for very nearly optimum performance of the amplifier in the presence of wide variations of the tube characteristics extending in some cases even to the use of tubes of different type numbers. This is especially true in the case of the output tubes.

My invention is not limited to the use of particular tube types nor to exact electrical dimensions of circuit components. Nevertheless, I have found that good results over wide range of frequencies may be obtained where the tubes $T_1$ and $T_2$ are 6V6 tubes supplied at 500 volts, with the transformer 11 stepping up from 117 volts to 260 volts A. C., condensers 14 and 15 having capacity of 80 microfarads, condenser 27, capacity of 20 microfarads, the condenser 30 having a capacity of 50 microfarads, resistor 25 having 8000 ohms; resistor 28, 2000 ohms; cathode resistor 45, 250,000 ohms, the anode resistor 37, $\frac{1}{10}$ megohm, cathode resistor 39, 5000 ohms; cathode resistor 52, 10,000 ohms, $R_5$ and $R_6$, 1 megohm and 3 megohms, respectively; anode resistor 49, 2 megohms; terminal 41 supplying minus 55 volts and terminal 53 supplying minus 145 volts.

The particular tube types to be employed, will of course, be varied according to the power output required. Moreover, the circuit is not critical as to the selection of tubes and it is not necessary to match tubes or to select from tubes of the same type in order to obtain a tube which will have precise characteristics in order to obtain satisfactory operation of the circuit. As illustrated in Fig. 2, tubes $T_1$ and $T_2$ and $T_3$ may be replaced by triode vacuum tubes and if the positive-current peak power requirements are not excessive, the cathode follower tube $T_4$ may be eliminated with a direct connection made between the anode 48 of $T_5$ and the control electrode 47 of the tube $T_3$.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention.

What is claimed is:

1. A direct coupled high-fidelity wide-range amplifier comprising in combination a pair of first and second vacuum tubes, each having an anode, a cathode and a control electrode, the anode of the second vacuum tube being connected to the cathode of the first to serve as an output terminal, and the remaining anode and cathode being adapted to be connected to a power supply, a load coupling circuit comprising a capacitor connected to the cathode of the first vacuum tube and adapted to have a load connected thereto and to the cathode of the second vacuum tube, a phase-splitter tube having a control electrode, an anode connected to the control electrode of said first vacuum tube and a cathode connected to the control electrode of the said second vacuum tube, and having anode and cathode resistors, an input tube having a control electrode serving as the input terminal for the amplifier, an anode connected to the control electrode of the phase splitter tube, a cathode connected to the said cathode of the said first vacuum tube, and anode and cathode resistance in series with said input tube, and a cathode follower tube interposed in the connection between the anode of said phase splitter tube and the control electrode of said first vacuum tube, said cathode follower tube having a control electrode connected to the anode of the phase splitter and a cathode connected to the control electrode of the said first vacuum tube.

2. A direct coupled high-fidelity wide-range amplifier for energization from a power supply, having positive and negative terminals, said amplifier comprising a pair of first and second vacuum tubes, each having an anode, a cathode and a control electrode, the anode of the second vacuum tube being connected to the cathode of the first to serve as an output terminal, and the remaining anode and cathode being adapted to be connected to the power supply terminals, phase-splitter tube means having control electrode means, an anode connected to the control electrode of said first vacuum tube and a cathode connected to the control electrode of the said second vacuum tube, and having anode and cathode resistors, an input tube having a control electrode serving as the input terminal for the amplifier, an anode connected to the control electrode means of the phase splitter tube means, a cathode connected to the said cathode of the said first vacuum tube, and anode and cathode resistance in series with said input tube, and a cathode follower tube interposed in the connection between the anode of said phase splitter tube and the control electrode of said first vacuum tube, said cathode follower tube having a control electrode connected to the said anode of the phase splitter means and a cathode connected to the control electrode of the said first vacuum tube.

3. A direct coupled wide-range amplifier for energization from a power supply with a plurality of fixed potential terminals including positive and negative terminals, said amplifier comprising a pair of first and second vacuum tubes, each having an anode, a cathode and a control electrode, the anode of the second vacuum tube being connected to the cathode of the first to serve as an output terminal, and the remaining anode and cathode being adapted to be connected to the power supply terminals, a phase-splitter tube having a control electrode, a screen grid, an anode connected to the control electrode of said first vacuum tube and a cathode connected to the control electrode of the said second vacuum tube, said screen grid being connected to a fixed potential terminal in the power supply and having anode and cathode resistances, a cathode follower tube interposed in the connection between the anode of the phase splitter tube and the control electrode of the first vacuum tube and an input tube having a control electrode serving as the input terminal for the amplifier, an anode connected to the control electrode of the phase splitter tube, a cathode conductively connected to the said cathode of the said first vacuum tube, and anode and cathode resistance in series with said input tube, said cathode follower tube having a control electrode connected to the said anode of the phase splitter tube and a cathode connected to the control electrode of the said first vacuum tube.

4. A vacuum-tube amplifier for energization from a power supply, comprising a pair of first and second vacuum tubes, each having an anode, a cathode and a control electrode, the anode of the second vacuum tube being connected to the cathode of the first to serve as an output terminal, and the remaining anode and cathode being adapted to be connected to the power supply terminals, phase-splitter tube means having control electrode means, an anode, additional electrode means adapted to be connected to a power supply terminal, and a cathode connected to the control electrode of the said second vacuum tube, and having anode and cathode loading, a cathode follower tube having an anode adapted to be connected to a power supply terminal, a control electrode connected to the anode of said phase splitter tube, and a cathode connected to the control electrode of said first vacuum tube, and an input tube having a control electrode serving as the input terminal for the amplifier, an anode connected to the control electrode of the phase splitter tube, a cathode conductively connected to the said cathode of the said first vacuum tube, and anode and cathode loading.

5. A vacuum tube amplifier comprising a cathode follower vacuum tube having a cathode, a second vacuum tube having an anode connected to the cathode of said cathode follower vacuum tube, an input tube having a cathode and being conductively coupled to the second vacuum tube and to the cathode follower tube, and feedback conductive connection from the junction of the second vacuum tube and the cathode-follower tube to said input tube cathode.

References Cited in the file of this patent

UNITED STATES PATENTS

| | | |
|---|---|---|
| 2,310,342 | Artzt | Feb. 9, 1943 |
| 2,431,973 | White | Dec. 2, 1947 |
| 2,438,960 | Blitz | Apr. 6, 1948 |

| | | |
|---|---|---|
| 2,488,567 | Stodola | Nov. 22, 1949 |
| 2,549,833 | Martinez | Apr. 24, 1951 |
| 2,631,198 | Parisoe | Mar. 10, 1953 |

OTHER REFERENCES

"Survey of D. C. Amplifiers," Artzt, RCA reprints from August 1945 issue of Electronics.

Terman text, "Radio Engineering," 3d ed., pp. 322–324, 547–554, pub. 1947 by McGraw-Hill Book Co., N. Y. C.

Sulzer article, Audio Engineering, May 1951, pages 15, 46, 47, and 48.